(12) United States Patent
Tai

(10) Patent No.: US 8,162,278 B2
(45) Date of Patent: Apr. 24, 2012

(54) MOUNT STRUCTURE

(75) Inventor: Chun-Ping Tai, Taipei County (TW)

(73) Assignee: AmTran Technology Co., Ltd, Taipei County (TW)

( * ) Notice: Subject to any disclaimer, the term of this patent is extended or adjusted under 35 U.S.C. 154(b) by 0 days.

(21) Appl. No.: 13/222,381

(22) Filed: Aug. 31, 2011

(65) Prior Publication Data

US 2011/0309223 A1   Dec. 22, 2011

Related U.S. Application Data

(62) Division of application No. 12/234,776, filed on Sep. 22, 2008, now Pat. No. 8,047,497.

(30) Foreign Application Priority Data

Jul. 16, 2008   (TW) ................................ 97212689 U

(51) Int. Cl.
*A47B 91/00* (2006.01)

(52) U.S. Cl. .................................. 248/346.03; 248/917

(58) Field of Classification Search ............ 248/346.03, 248/346.04, 146, 150, 158, 917; 361/679.01, 361/679.06, 679.24, 752

See application file for complete search history.

(56) References Cited

U.S. PATENT DOCUMENTS

| | | |
|---|---|---|
| 5,180,134 A | 1/1993 | Mallak |
| 6,775,151 B2 | 8/2004 | Suzuki |
| 6,813,159 B2 | 11/2004 | Irie et al. |
| 7,869,202 B2 | 1/2011 | Chiang et al. |
| 2007/0008686 A1 | 1/2007 | Jang |

*Primary Examiner* — Ramon Ramirez
(74) *Attorney, Agent, or Firm* — Rabin & Berdo, P.C.

(57) ABSTRACT

A mount structure includes a base and a bearer. The base has a slot, and at least one combining block is disposed protruding from the slot. The bearer has a bearing portion and a combining portion. The bearing portion is connected to a display, and the combining portion is installed in the slot through hooks, buckles, latches, screws, or other combining methods, such that the bearer is fixed on the base. Moreover, the combining portion is provided with reinforcing ribs for enhancing the structural strength of the bearer.

6 Claims, 10 Drawing Sheets

MOUNT STRUCTURE

CROSS-REFERENCE TO RELATED APPLICATIONS

This application is a divisional patent application of U.S. application Ser. No. 12/234,776 filed on Sep. 22, 2008, for "MOUNT STRUCTURE", now U.S. Pat. No. 8,047,497, issued on Nov. 1, 2011. This application is also claims priority under 35 U.S.C. §119(a) on Patent Application No(s). 097212689 filed in Taiwan, R.O.C. on Jul. 16, 2008. Each of theses application is incorporated herein by reference in its entirety.

BACKGROUND OF THE INVENTION

1. Field of Invention

The present invention relates to a mount structure, and more particularly to a mount structure for holding a display.

2. Related Art

Since TV sets are invented, consumers may enjoy the fanciest events worldwide at home, so as to be entertained while gaining knowledge. The TV set develops from the earliest cathode ray tube (CRT) to the recently most popular liquid crystal display (LCD), plasma display panel (PDP), and the like. Meanwhile, the TV set also changes from the early thick and heavy type of CRT to the current lighter and thinner type of LCD and PDP, such that it is possible for the user to install a thin display of a large size in a small indoor space without worrying about the sense of oppression.

Different from the early CRT, it is impossible for the thin display to provide a support surface itself, so the thin display is made to stand through a mount. During the initial stage of the development of the thin display, the size thereof is relatively small, and the mount thus has a simple structure for bearing the weight of the thin display. However, recently, as the panel technique becomes more and more mature, the thin display with an increasingly larger size but cheaper price gradually replaces the CRT to become the main stream of the household TV set.

The mount structure of the conventional thin display is integrally formed and has the following problems. The mount structure has integrally formed bottom base and support column, and after the thin display is assembled, the thin display is fixed on the support column. When disassembling the thin display, the bottom base cannot be separated from the support column. Thereby, it takes a large space to place the mount. Meanwhile, when the thin display is packed together with the mount for delivery, the packing cost is higher and the transportation fee is also increased. In addition, the integrally formed mount structure is mainly applied to thin displays with a small size. When adapted to assemble a thin display with a large size, the integrally formed mount structure is insufficient in structural strength, and thus the mount may be easily damaged in use.

SUMMARY OF THE INVENTION

The bottom base and the support column of the conventional mount structure are integrally formed. Therefore, during the packing process for delivery, it is impossible to separate the bottom base from the support column, so that the space utility of package is relatively low, and meanwhile the packing cost is increased. Further, as the integrally formed mount is mainly adapted to assemble a thin display with a small size, if the mount is applied to a thin display with a large size, problems on assembly and usage may occur due to overweight.

A mount structure provided by the present invention includes a base and a bearer, for holding a display. The base has a slot on a surface. At least a combining block is disposed protruding from the slot, and the combining block has at least a suspending hook. The bearer has a bearing portion and a combining portion. The bearing portion is used for being combined to the display, and the combining portion has at least a corresponding buckle hole with the same number as the hook on the combining block and a plurality of reinforcing ribs. The combining portion is installed in the slot of the base, and fixed therein by various means in addition to being engaged in the buckle hole through the hook, such as by correspondingly inserting a latch of the combining portion in a hole on the combining block, or using a screw passing through a tap hole of the combining portion and a perforation of the combining block. Further, the mount of the present invention further enhances the structural strength thereof for holding the display through the reinforcing ribs.

The efficacies of the present invention are as follows. A slot, for installing the bearer, is disposed on the base, so as to save the height space of the mount of the present invention. Meanwhile, as the center of gravity of the mount after the display is mounted thereon is relatively low, a higher stability is achieved. Further, through combing means such as the hooks, latches, bumps, and screws disposed on the bearer, the bearer is stably installed in the base. Moreover, a reinforcing rib structure is disposed on a lateral edge of the bearer, such that the overall strength and rigidity of the mount are greatly improved, and the mount is enabled to hold a thin display of a large size without being damaged. In addition, the base and the bearer of the mount of the present invention are separately formed, thus the packing cost is lowered while increasing the load capability of the container during transportation.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
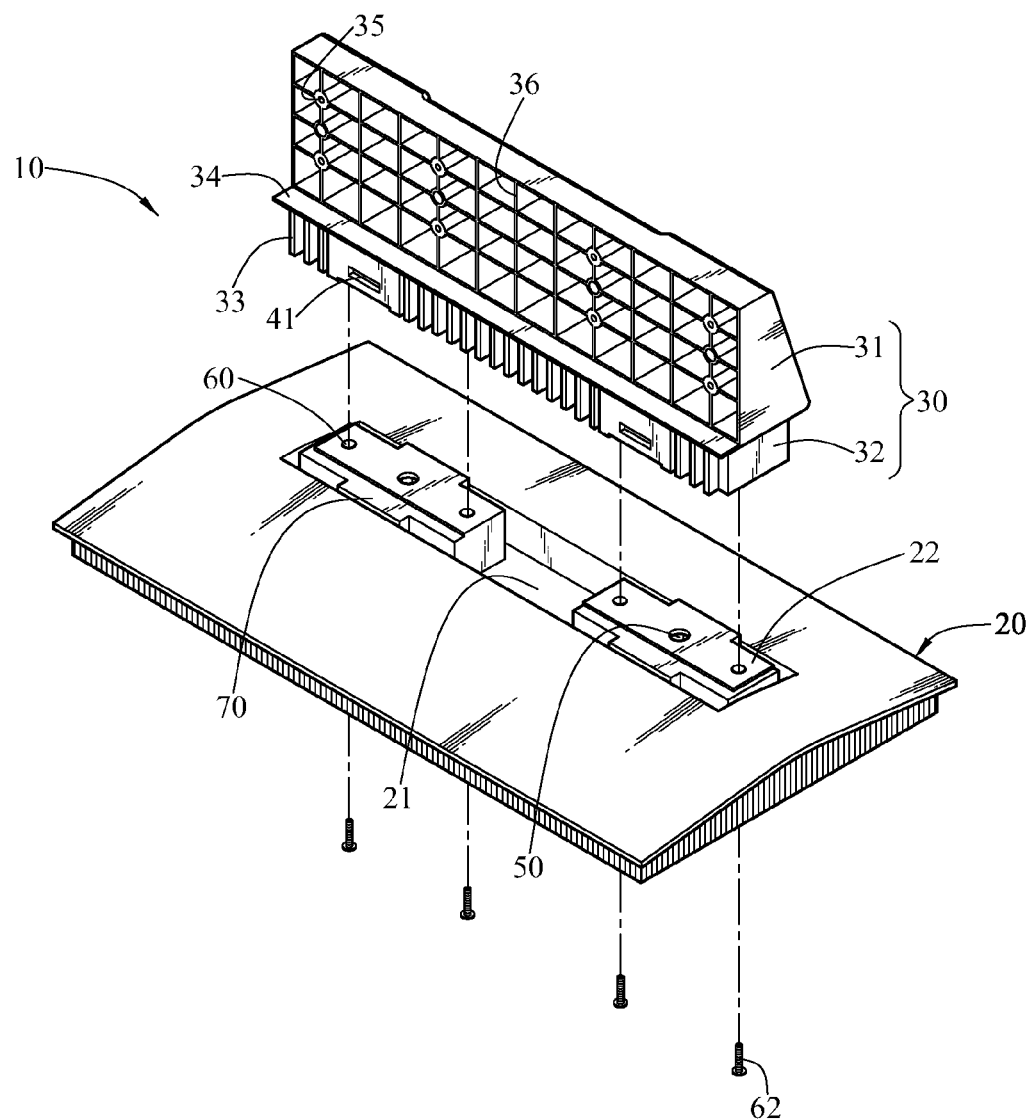
FIG. 1 is a schematic view showing the appearance of a mount structure according to a first embodiment of the present invention.

The detailed features and advantages of the present invention will be described in detail in the following embodiments. Those skilled in the arts can easily understand and implement the content of the present invention. Furthermore, the relative objectives and advantages of the present invention are apparent to those skilled in the arts with reference to the content disclosed in the specification, claims, and drawings. The embodiments below are intended to further describe the views of the present invention instead of limiting the scope of the same.

Referring to FIGS. 1 to 5, schematic views of a first embodiment of the present invention are shown. A mount structure of the present invention includes a base 20 and a bearer 30.

The base 20 has a surface of a quasi-trapezoidal structure with a relatively higher central part and two lower sides. A slot 21 is opened on an upper surface of the base 20, and two combining blocks 22 are disposed on and protrudent from the slot 21. The bearer 30 has a bearing portion 31 and a combining portion 32, the bearing portion 31 is used for being combined to the display 11, and the combining portion 32 is used for being installed in the slot 21, such that the bearer 30 is stably installed on the base 20.

Suspending hooks 40 are respectively disposed on two sides of each combining block 22 corresponding to the combining portion 32. Buckle holes 41 with the same number as the hooks 40 are disposed on one side of the combining portion 32 opposite to the base 20 and corresponding to the hooks 40. When the combining portion 32 is installed in the slot 21, the hooks 40 are engaged in the buckle holes 41, such that the bearer 30 is fixed in the slot 21 without getting loosened. In the mount structure of the present invention, the bearer 30 is disposed in the slot 21, such that the center of gravity of the mount 10 is lowered, and the entire occupation of height space is greatly reduced for being used in different occasions. Moreover, the present invention achieves a high stability, such that the overturn of the mount 10 resulted from slight collision can be prevented.

In order to reinforce the structural strength of the bearer 30 for supporting the display 11, a plurality of reinforcing ribs 33 is disposed protruding from a lower lateral edge of the combining portion 32 corresponding to two sides of the base 20, except for the positions of the buckle holes 41, such that the lateral edge of the combining portion 32 is tooth-like. When the bearer 30 is installed in the slot 21, the reinforcing ribs 33 contact the side walls and a bottom of the slot 21, and thus the weight of the bearer 30 and the display 11 after combination may be uniformly dispersed in the slot 21, so as to prevent permanent deformation of the bearer 30 after supporting the display 11 for a long time. Therefore, the structural strength of the bearer 30 for supporting the display 11 is enhanced, and the overall strength and rigidity of the mount structure of the present invention are greatly improved.

A through hole 50 is further disposed on each combining block 22, and latches 51 with the same number as the holes 50 are disposed on the combining portion 32 at positions corresponding to the holes 50. As the sizes of the latch 51 and the hole 50 are appropriately designed and accurately matched, when the bearer 30 is installed on the base 20 and each latch 51 is inserted in the corresponding hole 50, the latch 51 is pressed to generate a counterforce and abuts against the hole 50. Thereby, the latch 51 may be inserted in the hole 50 in a closely matching manner, and the bearer 30 can thus be more stably installed on the base 20.

At least a through perforation 60 is further disposed on each combining block 22, and tap holes 61 with the same number as the perforations 60 are disposed on the combining portion 32 at positions corresponding to the perforations 60. When the combining portion 32 is installed in the slot 21, screws 62 pass through the perforations 60 from a back surface of the base 20 and are locked in the tap holes 61, such that the base 20 and the bearer 30 are closely combined to prevent from being separated from each other under an external collision.

Figure 2:
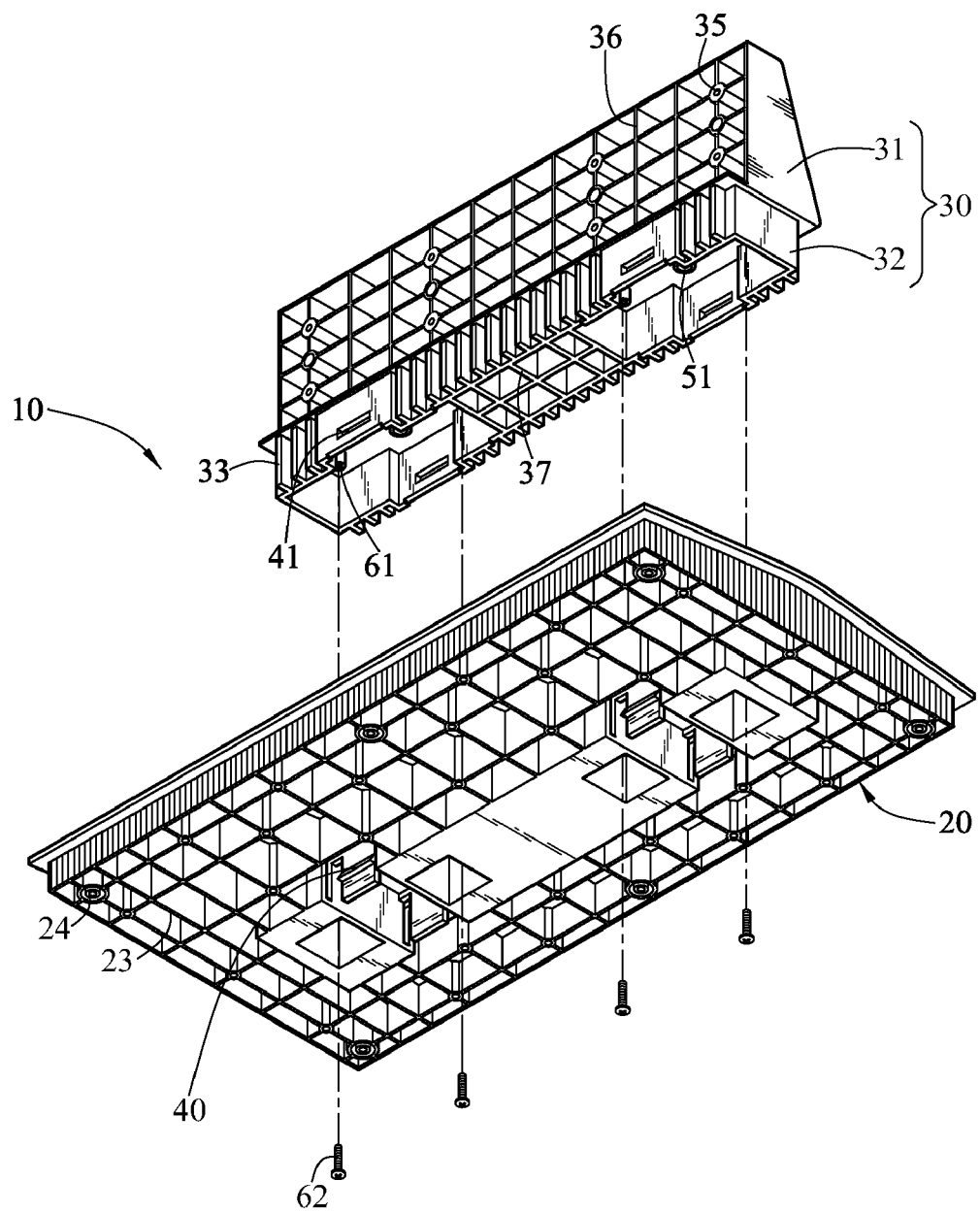
FIG. 2 is a schematic view showing the appearance of the mount structure according to the first embodiment of the present invention.
Figure 3:
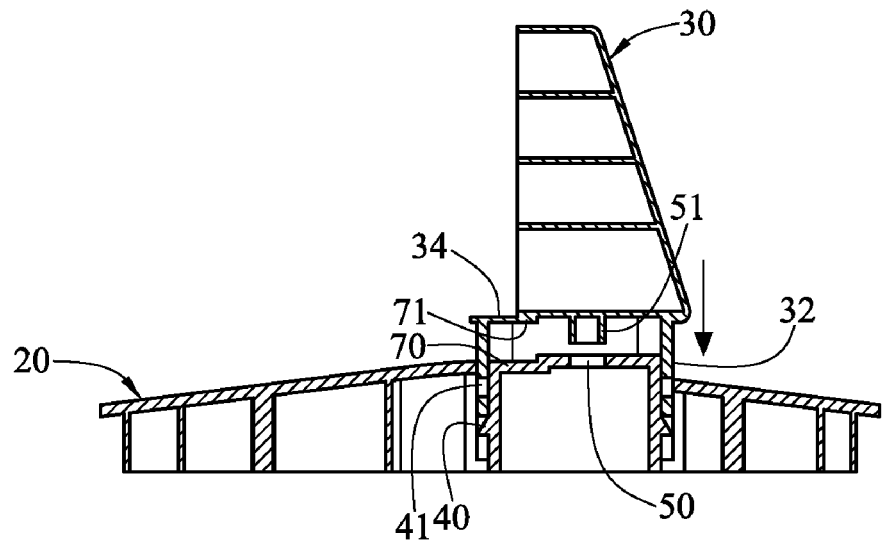
FIG. 3 is a cross-sectional side view of the mount structure according to the first embodiment of the present invention.
Figure 4:
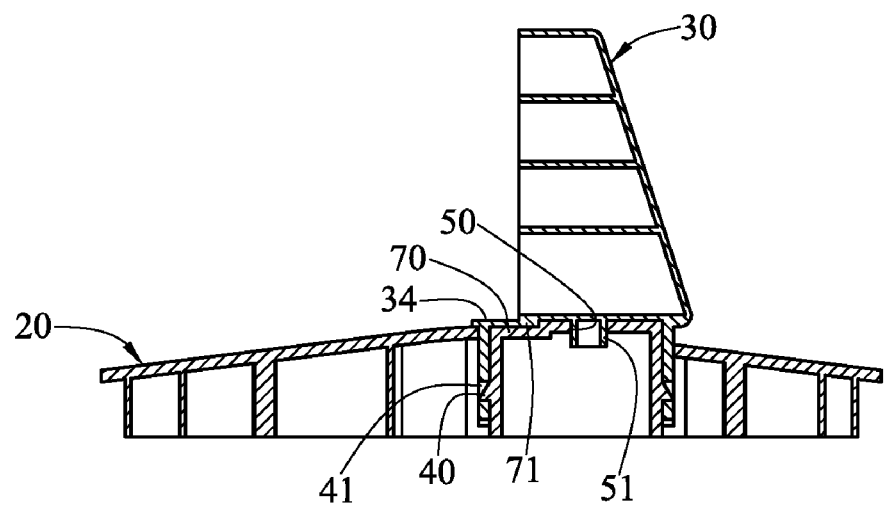
FIG. 4 is a cross-sectional side view of the mount structure according to the first embodiment of the present invention.
Figure 5:
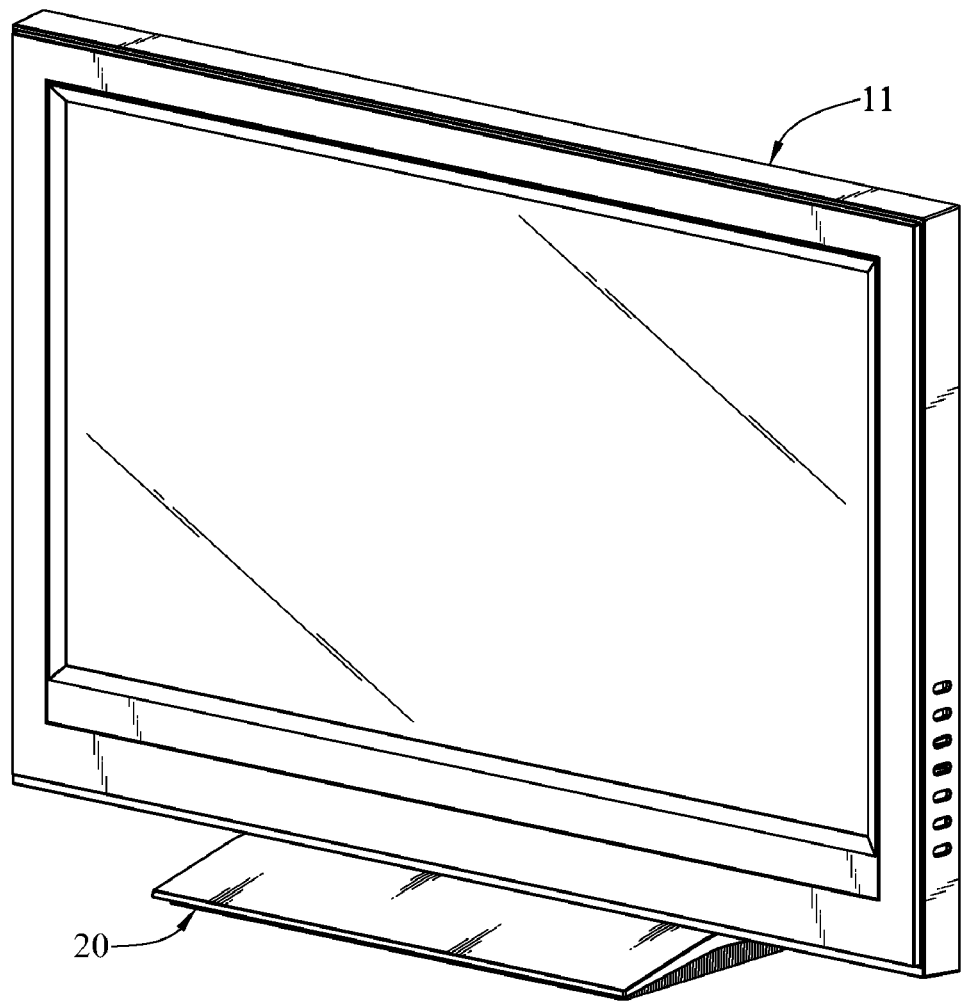
FIG. 5 is a schematic three-dimensional view of the mount structure according to the first embodiment of the present invention.

When the bearer 30 is installed on the base 20, the screen of the display 11 must be turned to face the user. The combining block 22 further has a rabbet 70 that prevents the user from installing the bearer 30 in an opposite direction, and a bump 71 of the combining portion 32 must be lodged with the rabbet 70. During the installation, if the bearer 30 is installed on the base 20 in an incorrect direction, the bump 71 abuts against the surface of the combining block 22, and at this time, the bearer 30 cannot be entirely installed in the slot 21 to ensure the correctness of the installing direction. When the display 11 is connected to the bearing portion 31, the bottom surface of the display 11 is mounted on the carrying surface 34, and then the screws (not shown) pass through locking holes 35 (as shown in FIG. 2) from one side of a chamfer of the bearing portion 31, so as to fix the display 11 on the bearer 30.

In order to reinforce the structural strength of the bearer 30 for supporting the display 11, in addition to the locking holes 35 on the bearing portion 31 for fixing the display 11, fixing ribs 36, parallel and perpendicular to each other while crossed with each other, are also disposed in the hollow part, so as to prevent the bearing portion 31 from being damaged due to the overweight of the display 11. Support ribs 37 in a shape of "#" are also disposed on one surface of the combining portion 32 corresponding to the base 20. When the bearer 30 is installed in the slot 21, the support ribs 37 contact the bottom of the slot 21, such that after the bearer 30 and the display 11 are combined, the support ribs 37 have the function similar to the reinforcing ribs 33, so as to disperse the endured weight in the slot 21, thus enhancing the structural strength of the bearer 30 for supporting the display 11.

In addition, in order to reinforce the structural strength of the base 20 for supporting the display 11 and the bearer 30, protruding ribs 23 in a shape of "#" are also disposed in the hollow part of the back surface of the base 20, so as to enhance the rigidity and the strength of the base 20. Thereby, the weight of the display 11 and the bearer 30 may be uniformly dispersed on the placing plane, and the permanent deformation resulted from the overweight of the base 20 may also be avoided. In order to increase the friction between the base 20 and the placing plane, an anti-slip gasket, for example, made of rubber, is installed on round holes 24, so as to avoid a movement of the base 20 relative to the placing plane.

Figure 6:
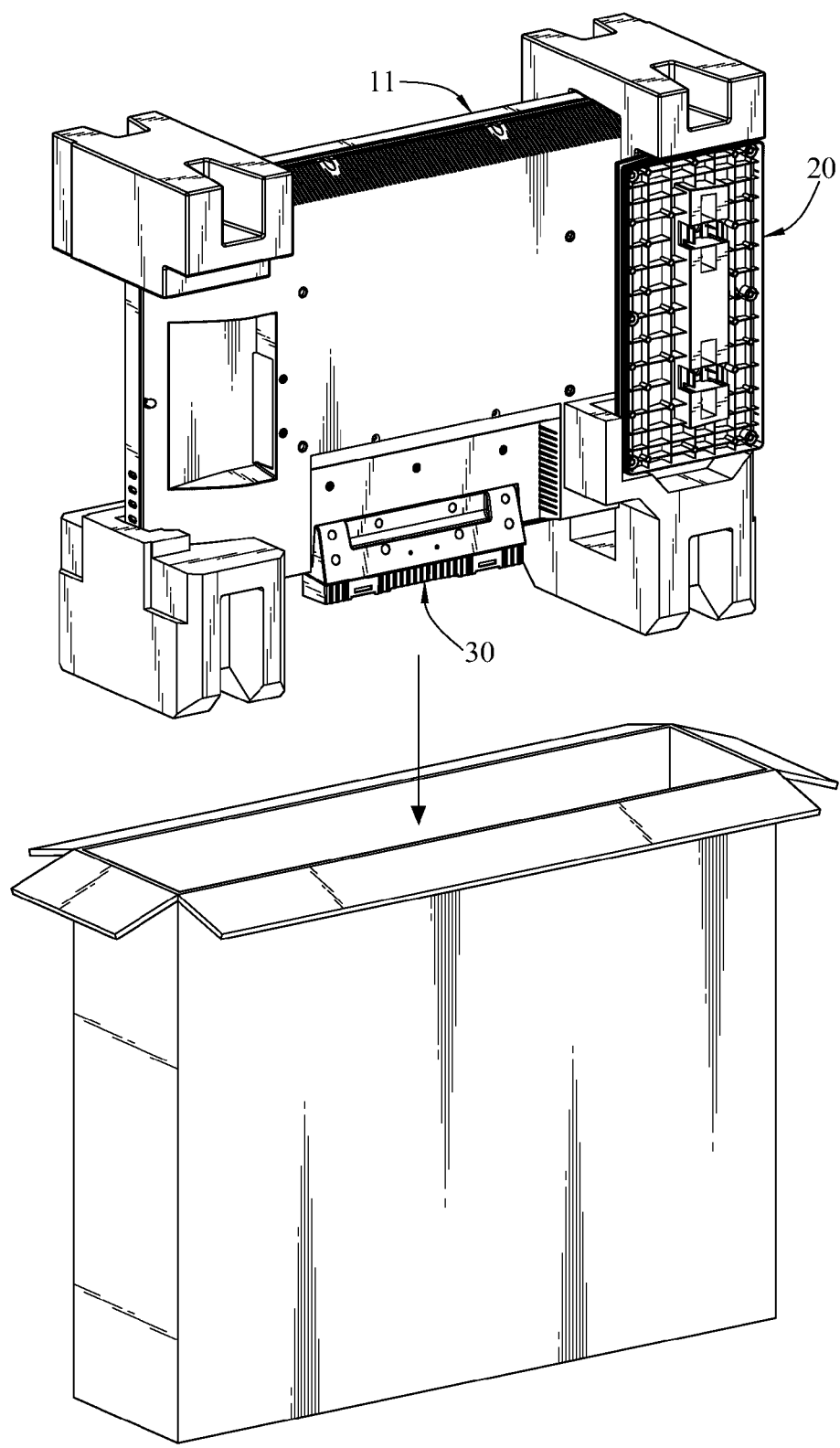
FIG. 6 is a schematic view showing the encasement of the mount structure according to the first embodiment of the present invention.

Referring to FIG. 6, during the packing and encasing process, the display 11 and the bearer 30 are integrally connected, and the base 20 may be placed in styrofoam or a buffer pad on the back side of the display 11, so the total occupied space is relatively small, thus lowering the cost of packing and transportation. In addition, in other embodiments of the present invention, the display 11, the base 20, and the bearer 30 may be encased in a separated or disassembled form without being limited to the manner shown in FIG. 6.

Figure 7:
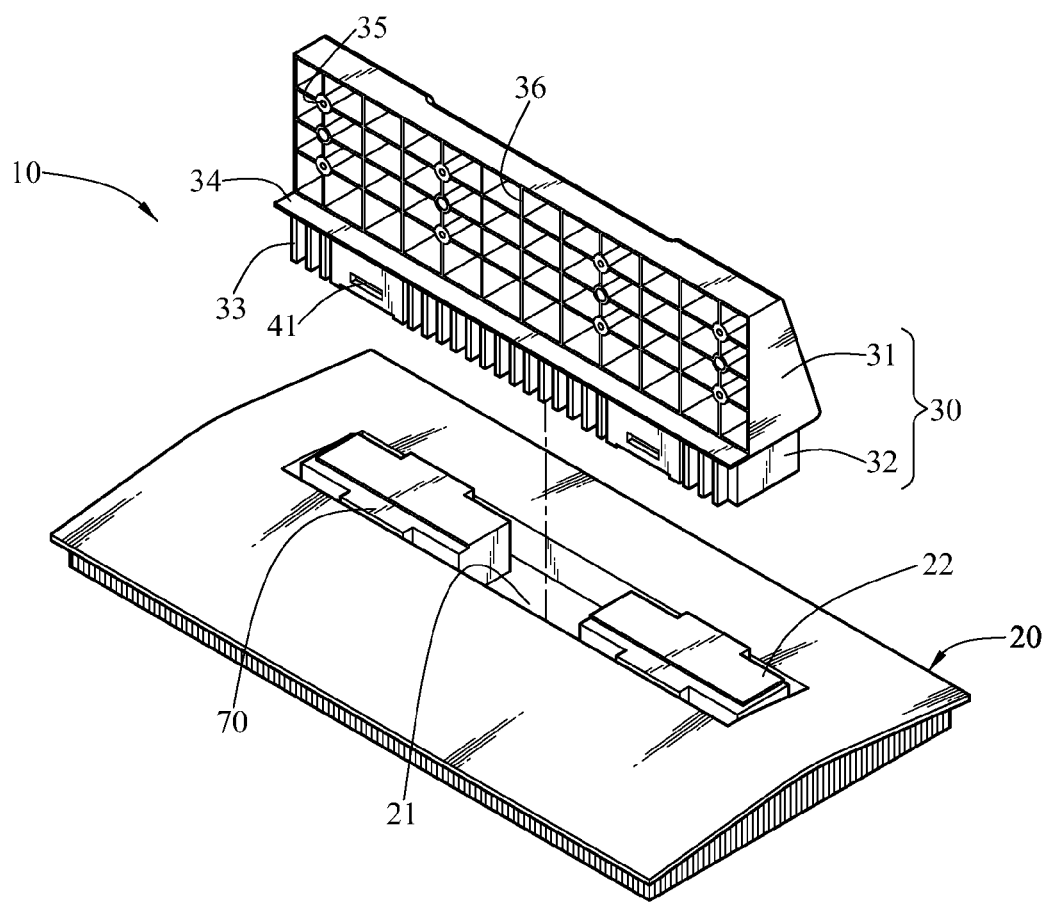
FIG. 7 is a schematic view showing the appearance of a mount structure according to a second embodiment of the present invention.
Figure 8:
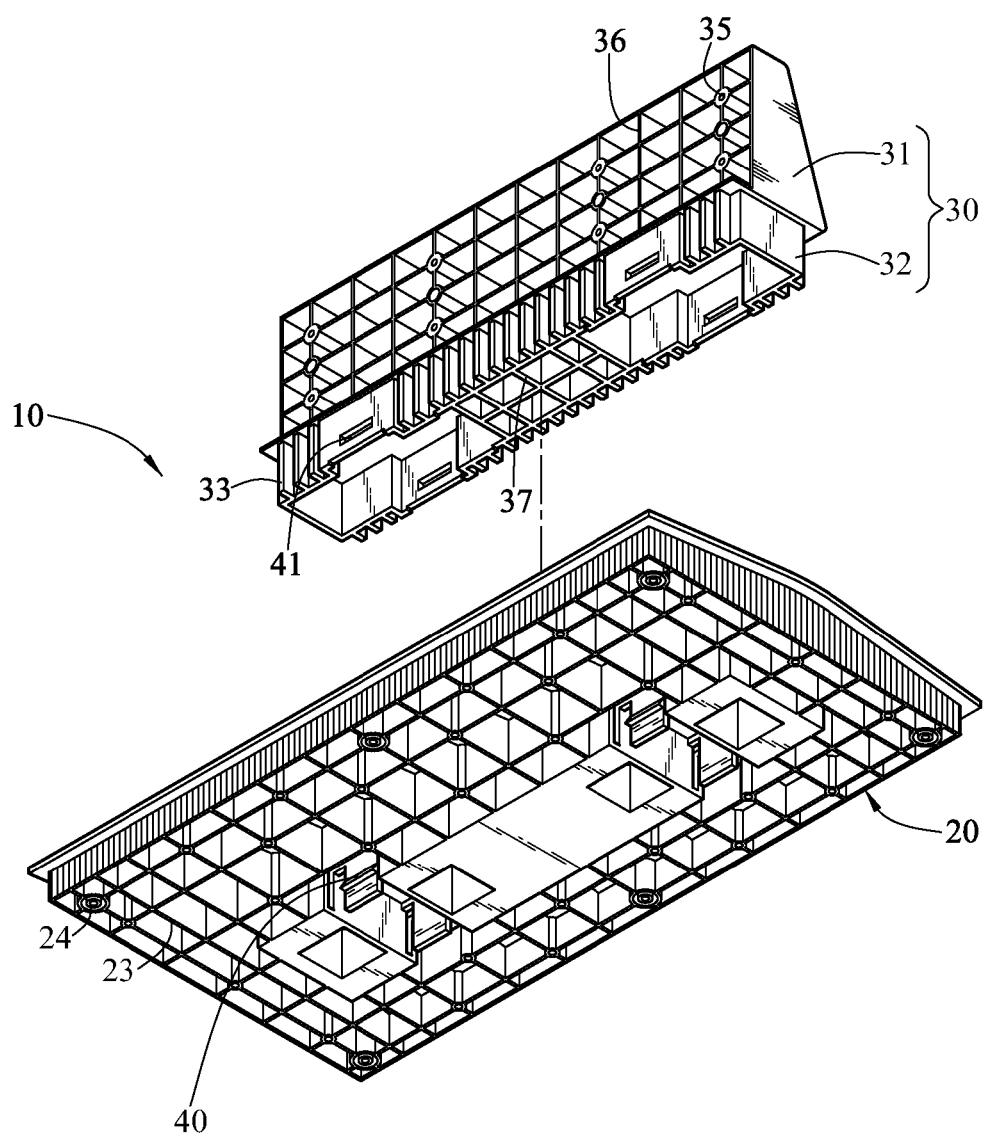
FIG. 8 is a schematic view showing the appearance of the mount structure according to the second embodiment of the present invention.

Referring to FIGS. 7 and 8, schematic views of a second embodiment of the present invention are shown, in which symbols of FIGS. 1 to 4 are employed. A mount structure of the present invention includes a base 20 and a bearer 30. The base 20 has a surface of a quasi-trapezoidal structure with a relatively higher central part and two lower sides. A slot 21 is opened on an upper surface of the base 20, and two combining blocks 22 are disposed protruding from the slot 21. The bearer 30 has a bearing portion 31 and a combining portion 32, the bearing portion 31 is used for being combined to the display 11 (referring to FIG. 5), and the combining portion 32 is used for being installed in the slot 21, such that the bearer 30 is stably installed on the base 20. Suspending hooks 40 are respectively disposed on two sides of the combining block 22 corresponding to the combining portion 32, and buckle holes 41 with the same number as the hooks 40 are disposed on one side of the combining portion 32 opposite to the base 20 and corresponding to the hooks 40. When the combining portion 32 is installed in the slot 21, the hooks 40 are engaged in the buckle holes 41, and thus the bearer 30 is fixed in the slot 21 without getting loosened.

This embodiment is different from the first embodiment in that the combining block 22 does not have the holes 50 and the perforations 60, and the combining portion 32 does not have the latches 51 and the tap holes 61, so that the combining portion 32 is directly fixed on the base 20 through the hooks 40 and the buckle holes 41, and thus the bearer 30 of the mount structure of the present invention is disposed in the slot 21. The advantages are as follows. The bearer 30 and the base 20 can be conveniently assembled or disassembled, the center of gravity of the mount 10 is lowered, and the entire height space is greatly reduced for being used in different occasions. Moreover, the present invention has a high stability, so as to prevent the overturn of the mount 10 resulted from slight collision.

In addition, similar to the first embodiment, the mount structure of the present invention also includes reinforcing ribs 33, rabbets 70, bumps 71, fixing ribs 36, support ribs 37, protruding ribs 23, and round holes 24, etc., so as to reinforce the structural strength and the rigidity of the mount 10, and ensure the correctness of the installing direction.

Figure 9:
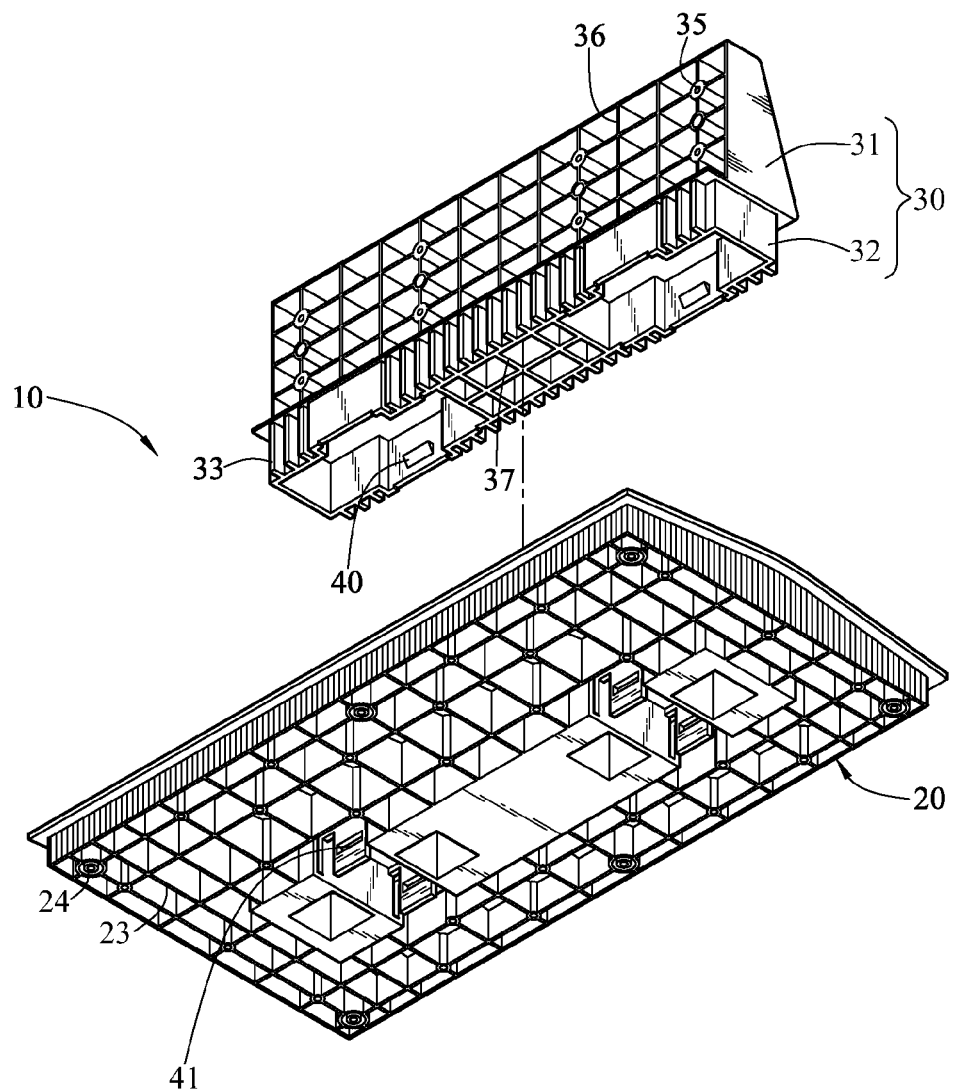
FIG. 9 is a schematic view showing the appearance of a mount structure according to a third embodiment of the present invention.

Referring to FIG. 9, a schematic view of a third embodiment of the present invention is shown, in which numerals of FIGS. 1 to 4 are employed. A mount structure of the present invention includes a base 20 and a bearer 30. A slot 21 (referring to FIG. 1) is opened on an upper surface of the base 20, and two combining blocks 22 (referring to FIG. 1) are disposed protruding from the slot 21. The bearer 30 has a bearing portion 31 and a combining portion 32, the bearing portion 31 is used for being combined to the display 11 (referring to FIG. 5), and the combining portion 32 is used for being installed in the slot 21, such that the bearer 30 is stably installed on the base 20. Buckle holes 41 are respectively disposed on two sides of each combining block 22 corresponding to the combining portion 32, and hooks 40 with the same number as the buckle holes 41 are disposed on one side of the combining portion 32 opposite to the base 20 and corresponding to the buckle holes 41. When the combining portion 32 is installed in the slot 21, the hooks 40 are engaged in the buckle holes 41, such that the bearer 30 is fixed in the slot 21 without getting loosened.

This embodiment is different from the second embodiment in that the buckle holes 41 are disposed on the combining block 22, and the hooks 40 are disposed on the combining portion 32, so that the combining portion 32 is directly fixed on the base 20 through the buckle holes 41 and the hooks 40, and thus the bearer 30 of the mount structure of the present invention is disposed in the slot 21. The advantages are as follows. The center of gravity of the mount 10 is lowered, and the entire height space is greatly reduced for being used in different occasions. Moreover, the present invention achieves a high stability, so as to prevent the overturn of the mount 10 resulted from slight collision.

In addition, similar to the first embodiment, the mount structure of the present invention also includes reinforcing ribs 33, rabbets 70, bumps 71, fixing ribs 36, support ribs 37, protruding ribs 23, and round holes 24, etc., so as to reinforce the structural strength and the rigidity of the mount 10, and ensure the correctness of the installing direction.

Figure 10:
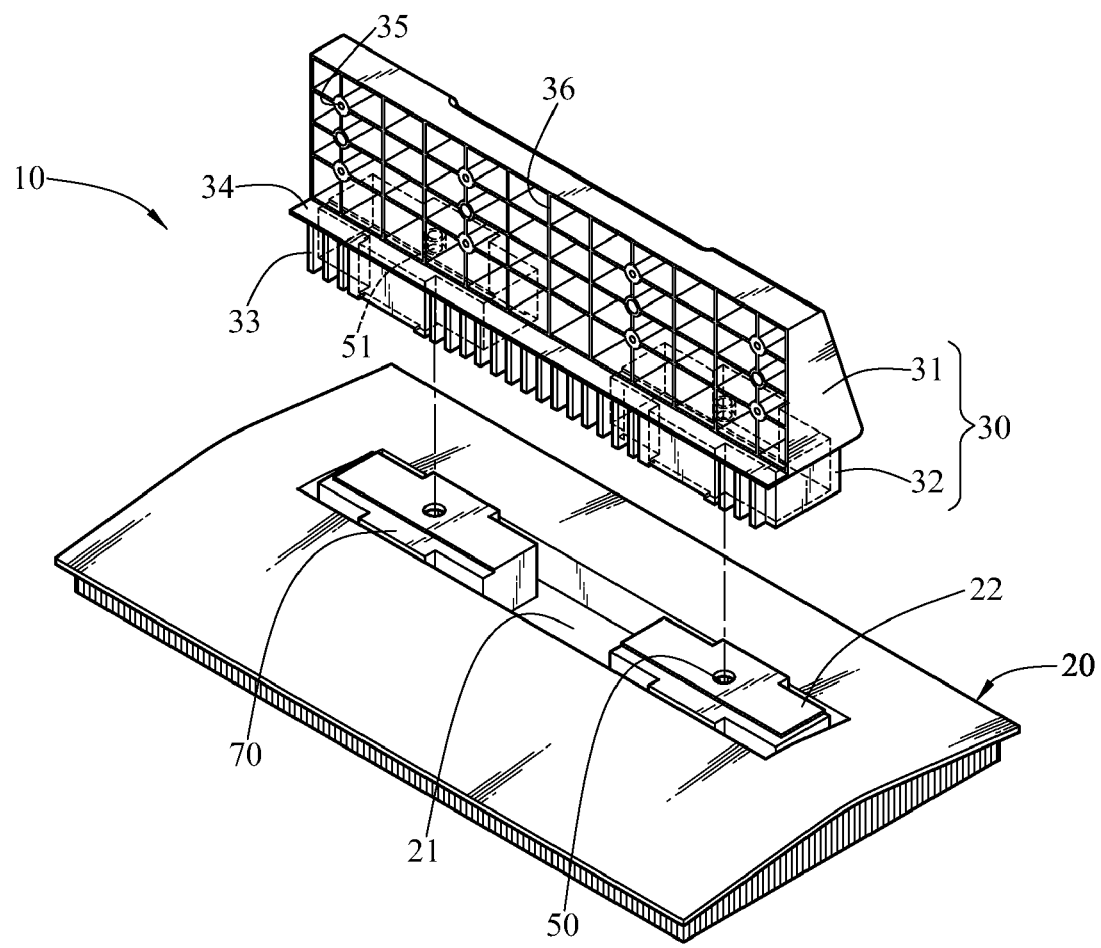
FIG. 10 is a schematic view showing the appearance of a mount structure according to a fourth embodiment of the present invention.

Referring to FIG. 10, a schematic view of a fourth embodiment of the present invention is shown, in which numerals of FIGS. 1 to 4 are employed. A mount structure of the present invention includes a base 20 and a bearer 30. A slot 21 is opened on an upper surface of the base 20, and two combining blocks 22 are disposed protruding from the slot 21. The bearer 30 has a bearing portion 31 and a combining portion 32, the bearing portion 31 is used for being combined to the display 11 (referring to FIG. 5), and the combining portion 32 is used for being installed in the slot 21, such that the bearer 30 is stably installed on the base 20. A through hole 50 is disposed on each combining block 22, and latches 51 with the same number as the holes 50 are disposed on the combining portion 32 at positions corresponding to the holes 50. As the sizes of the latch 51 and the hole 50 are appropriately designed and accurately matched with each other, when the bearer 30 is installed on the base 20 and the latches 51 are inserted in the corresponding holes 50, the latches 51 are pressed to generate a counterforce and abut against the holes 50. Thereby, the latches 51 may be inserted in the holes 50 in a closely matching manner, and the bearer 30 can thus be more stably installed on the base 20.

This embodiment is different from the first embodiment in that the combining block 22 does not have the hooks 40 and the perforations 60, and the combining portion 32 does not have the buckle holes 41 and the tap holes 61, so that the combining portion 32 is directly fixed on the base 20 through the latches 51 and the holes 50, and thus the bearer 30 of the mount structure of the present invention is disposed in the slot 21. It should be noted that, although FIG. 10 shows that each combining block 22 has a hole 50 disposed on the central part, in other embodiments, the number and the disposed positions of the holes 50 of the combining block 22 may differ upon various requirements. Through the design of the latches 51 and the holes 50, the center of gravity of the mount 10 is lowered, and the entire height space is greatly reduced for being used in different occasions. Moreover, the present invention achieves a high stability, such that the overturn of the mount 10 resulted from slight collision is prevented.

In addition, similar to the first embodiment, the mount structure of the present invention also includes reinforcing ribs 33, rabbets 70, bumps 71, fixing ribs 36, support ribs 37, protruding ribs 23, and round holes 24, etc., so as to reinforce the structural strength and the rigidity of the mount 10, and ensure the correctness of the installing direction.

Figure 11:
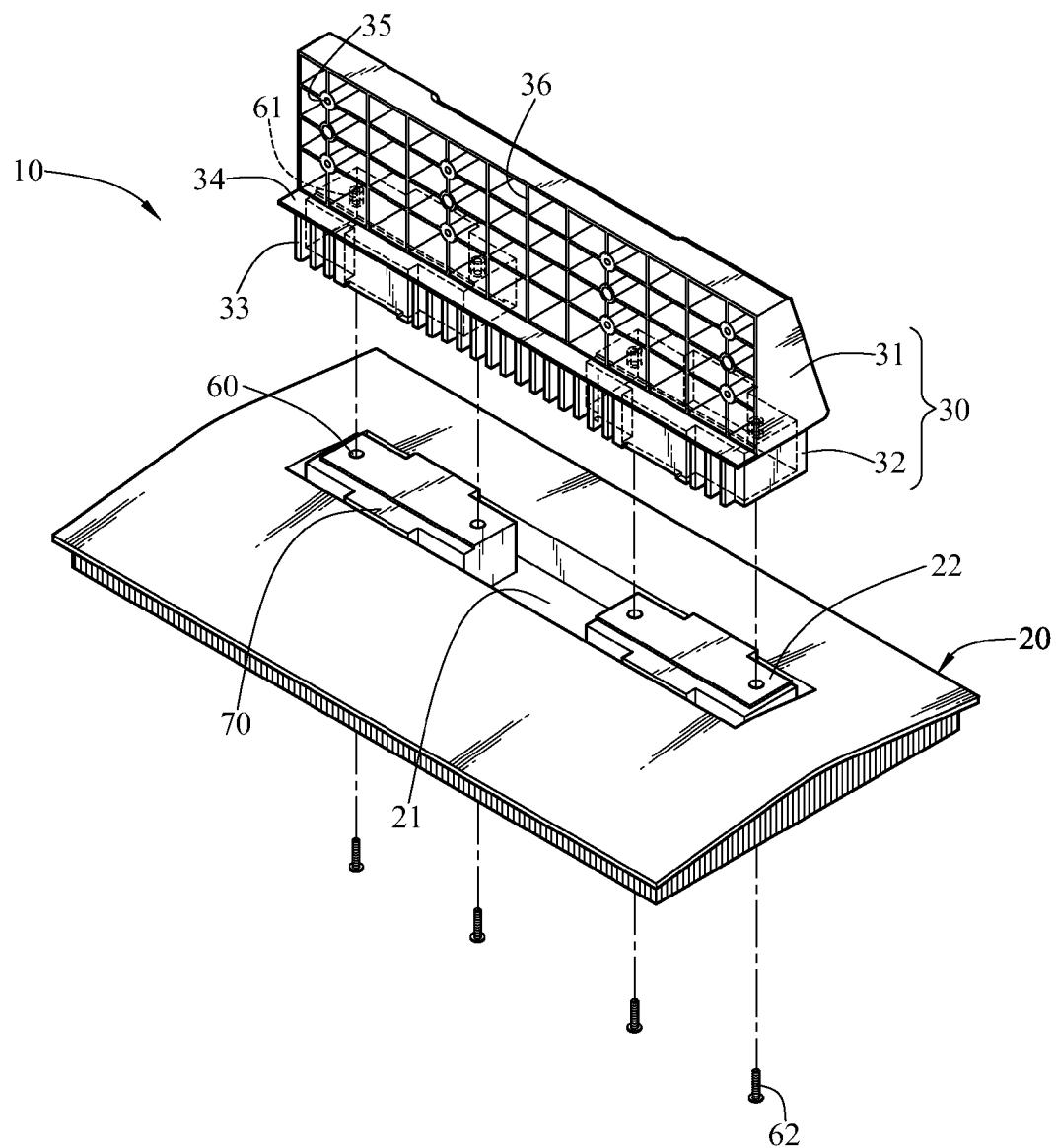
FIG. 11 is a schematic view showing the appearance of a mount structure according to a fifth embodiment of the present invention.

Referring to FIG. 11, a schematic view of a fifth embodiment of the present invention is shown, in which numerals of FIGS. 1 to 4 are employed. A mount structure of the present invention includes a base 20 and a bearer 30. A slot 21 is opened on an upper surface of the base 20, and two combining blocks 22 are disposed protruding from the slot 21. The bearer 30 has a bearing portion 31 and a combining portion 32, the bearing portion 31 is used for being combined to the display 11 (referring to FIG. 5), and the combining portion 32 is used for being installed in the slot 21, such that the bearer 30 is stably installed on the base 20. Perforations 60 are disposed on each combining block 22, and tap holes 61 with the same number as the perforations 60 are disposed on the combining portion 32 at positions corresponding to the perforations 60. When the combining portion 32 is installed in the slot 21, screws 62 pass through the perforations 60 from a back side of the base 20 and are locked in the tap holes 61, such that the base 20 and the bearer 30 are closely combined to prevent from being separated from each other under an external collision.

This embodiment is different from the first embodiment in that the combining block 22 does not have the hooks 40 and the holes 50, and the combining portion 32 does not have the buckle holes 41 and the latches 51, so that the combining portion 32 and the base 20 are locked by the screws 62 directly passing through the perforations 60 and the tap holes 61, and thus the bearer 30 of the mount structure of the present invention is disposed in the slot 21. It should be noted that, though FIG. 11 shows that each combining block 22 has two perforations 60 disposed on two sides, in other embodiments, the number and the disposed positions of the perforations 60 of the combining block 22 may differ upon various requirements.

In addition, similar to the first embodiment, the mount structure of the present invention also includes reinforcing ribs 33, rabbets 70, bumps 71, fixing ribs 36, support ribs 37, protruding ribs 23, and round holes 24, etc., so as to reinforce the structural strength and the rigidity of the mount 10, and ensure the correctness of the installing direction.

The efficacies of the present invention are as follows. As a slot is disposed on the base, the bearer is installed on the base and then connected to the display, the center of gravity of the mount is lowered, and the stability thereof is enhanced. Further, through combing means such as the hooks, latches, bumps, and screws, the bearer is stably connected to the combining block of the base. Moreover, a reinforcing rib structure is disposed on a lateral edge of the bearer, such that the overall strength and rigidity of the mount are greatly improved, and the mount is enabled to hold a thin display of a large size without being damaged. In addition, the base and the bearer of the mount of the present invention are separately designed, thus the packing cost is lowered while increasing the load capability of the container during transportation.

What is claimed is:

1. A mount structure, for holding a display, comprising:
   a base, having a slot, wherein at least one combining block is disposed protruding from the slot, and the combining block has at least one buckle hole; and
   a bearer, having a bearing portion and a combining portion, wherein the bearing portion is adapted to hold the display, the combining portion has a corresponding hook with the same number as the buckle hole and a plurality of reinforcing ribs, the combining portion is installed in the slot, and the hook is engaged in the buckle hole, such that the bearer is fixed on the base, and supports the display through the reinforcing ribs.

2. The mount structure according to claim 1, wherein the combining block has a hole, a latch is disposed protruding from one side of the bearer opposite to the base, and the latch is inserted in the hole, such that the bearer is fixed on the base.

3. The mount structure according to claim 1, wherein the combining block has a perforation, a tap hole is disposed on one side of the bearer opposite to the base, and the mount structure further comprises a screw passing through the perforation and locked in the tap hole, such that the bearer is fixed on the base.

4. The mount structure according to claim 1, wherein the combining block has a rabbet, a bump is disposed protruding from one side of the bearer opposite to the base, and the bump is lodged with the rabbet, such that the bearer is fixed on the base.

5. The mount structure according to claim 1, wherein a plurality of protruding ribs is further disposed on the other side of the base opposite to the bearer.

6. The mount structure according to claim 1, wherein a plurality of support ribs is further disposed on one side of the combining portion opposite to the base.

* * * * *